(12) United States Patent
Duan et al.

(10) Patent No.: US 9,401,731 B2
(45) Date of Patent: Jul. 26, 2016

(54) SKEW CONTROL FOR THREE-PHASE COMMUNICATION

(71) Applicant: QUALCOMM Incorporated, San Diego, CA (US)

(72) Inventors: Ying Duan, San Diego, CA (US); Harry Huy Dang, San Diego, CA (US); Chulkyu Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/722,271

(22) Filed: May 27, 2015

(65) Prior Publication Data

US 2015/0381218 A1    Dec. 31, 2015

Related U.S. Application Data

(60) Provisional application No. 62/016,937, filed on Jun. 25, 2014.

(51) Int. Cl.

| | |
|---|---|
| *H04L 27/00* | (2006.01) |
| *H04B 1/04* | (2006.01) |
| *H04B 15/02* | (2006.01) |
| *H04B 3/30* | (2006.01) |
| *H04L 25/02* | (2006.01) |
| *H04L 25/03* | (2006.01) |

(52) U.S. Cl.
CPC ............... *H04B 1/0475* (2013.01); *H04B 3/30* (2013.01); *H04B 15/02* (2013.01); *H04L 25/028* (2013.01); *H04L 25/03878* (2013.01)

(58) Field of Classification Search
CPC ......................... H04L 25/0272; H04L 25/0292

USPC .......................................................... 375/257
See application file for complete search history.

(56) References Cited

U.S. PATENT DOCUMENTS

| | | | | |
|---|---|---|---|---|
| 3,660,675 | A  * | 5/1972  | Andrews, Jr. ................... | 326/30 |
| 6,194,924 | B1 * | 2/2001  | Welch et al. .................. | 327/112 |
| 6,346,832 | B1   | 2/2002  | Young | |
| 6,552,582 | B1 * | 4/2003  | Bryan et al. .................. | 327/108 |
| 8,064,535 | B2 * | 11/2011 | Wiley ........................... | 375/288 |
| 8,472,551 | B2 * | 6/2013  | Wiley ........................... | 375/288 |

(Continued)

OTHER PUBLICATIONS

International Search Report and Written Opinion for PCT/US2015/032898, mailed Aug. 3, 2015, 11 pages.

(Continued)

*Primary Examiner* — Helene Tayong
(74) *Attorney, Agent, or Firm* — Withrow & Terranova, PLLC

(57) ABSTRACT

Aspects disclosed in the detailed description include skew control for three-phase communication. A three-phase communication involves three signal branches. A signal skew may occur when one signal branch is being coupled to a common mode voltage while another signal branch is being decoupled from the common mode voltage. In this regard, in one aspect, an impedance mismatch is introduced in the signal branch being coupled to the common mode voltage to help shift a rightmost crossing of the signal skew leftward. In another aspect, a current source or a current sink is coupled to the signal branch being decoupled from the common mode voltage to help shift a leftmost crossing of the signal skew rightward. By shifting the rightmost crossing leftward and the leftmost crossing rightward, it is possible to reduce the signal skew, thus leading to reduced jitter and improved data integrity in the three-phase communication.

31 Claims, 11 Drawing Sheets

(56) References Cited

U.S. PATENT DOCUMENTS

| | | |
|---|---|---|
| 8,536,913 B2 | 9/2013 | Chen et al. |
| 8,630,317 B2 | 1/2014 | Zerbe et al. |
| 2009/0058480 A1 | 3/2009 | Kamath |
| 2010/0244899 A1* | 9/2010 | Hoque et al. ............... 326/64 |
| 2012/0146686 A1 | 6/2012 | Maarouf |
| 2013/0241759 A1 | 9/2013 | Wiley et al. |

OTHER PUBLICATIONS

Kim, E. et al., "Adaptive skew control of data-strobe encoding for mobile display serial transceiver," Abstract Only, IEEE Transactions on Consumer Electronics, vol. 57, Issue 1, Feb. 2011, 2 pages.

MIPI Alliance, "Specification for C-PHY," Version 1.0, Aug. 5, 2014, MIPI Alliance, Inc., 132 pages.

* cited by examiner

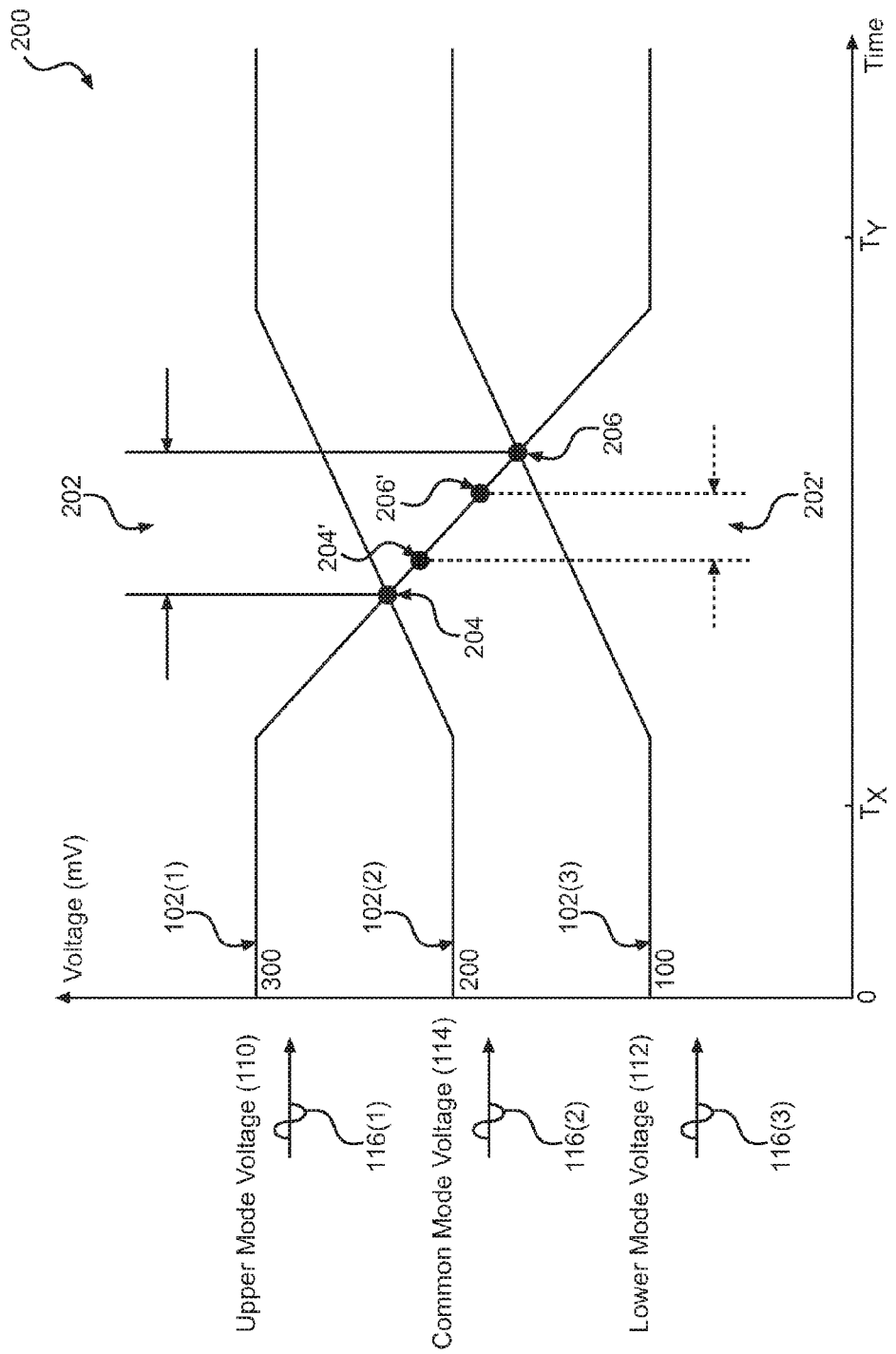

SKEW CONTROL FOR THREE-PHASE COMMUNICATION

PRIORITY CLAIM

The present application claims priority to U.S. patent application Ser. No. 62/016,937 filed on Jun. 25, 2014 and entitled "SKEW CONTROL FOR THREE-PHASE COMMUNICATION," which is incorporated herein by reference in its entirety.

BACKGROUND

I. Field of the Disclosure

The technology of the disclosure relates generally to supporting digital cameras in communication devices and, more particularly, to supporting the digital cameras using the MIPI® Alliance camera serial interface (CSI).

II. Background

Mobile communication devices have become increasingly common in current society. The prevalence of these mobile communication devices is driven in part by the many functions that are now enabled on such devices. Increased processing capabilities in such devices means that mobile communication devices have evolved from being purely communication tools into sophisticated mobile entertainment centers, thus enabling enhanced user experiences.

Digital imaging is deemed by many end users as one of the most critical features in mobile communication devices. As a result, highly sophisticated digital camera sensors are integrated into the mobile communication devices to provide higher resolution and better sensitivity in digital imaging applications. After digital images are captured, raw digital data associated with the digital images are transmitted from the digital camera sensor to an image processor for further processing and rendering. Because the raw digital data are transmitted over various transmission lines and/or interfaces, the raw digital data may be distorted due to inter-symbol interference (ISI), reflections, and crosstalk caused by lossy transmission lines. In this regard, the mobile communication devices are unable to produce high quality digital images despite having the highly sophisticated digital camera sensors. Hence, it is desirable to minimize distortions caused by the lossy transmission lines in the mobile communication devices.

SUMMARY OF THE DISCLOSURE

Aspects disclosed in the detailed description include skew control for three-phase communication. In a non-limiting example, the skew control for three-phase communication may be supported in mobile communication devices using the MIPI® Alliance three-phase camera serial interface (CSI-3) specification. A three-phase communication involves three signal branches. A signal skew may occur when one signal branch is being coupled to a common mode voltage while another signal branch is being decoupled from the common mode voltage. In this regard, in one aspect, an impedance mismatch is introduced in the signal branch being coupled to the common mode voltage to help shift a rightmost crossing of the signal skew leftward. In another aspect, a current source or a current sink is coupled to the signal branch being decoupled from the common mode voltage to help shift a leftmost crossing of the signal skew rightward. More specifically, the current source or the current sink is coupled to the signal branch if the signal branch is switched from the common mode voltage to a lower voltage or a higher voltage. By shifting the rightmost crossing leftward and the leftmost crossing rightward, it is possible to reduce the signal skew, thus leading to reduced jitter and improved data integrity in the three-phase communication.

In his regard in one aspect, a three-phase transmitter is provided. The three-phase transmitter comprises a first signal branch, a second signal branch, and a third signal branch. Each of the first signal branch, the second signal branch, and the third signal branch comprises a respective branch impedance and a respective driving impedance. If a signal branch among the first signal branch, the second signal branch, and the third signal branch is selected to function as a common mode branch by being coupled to a common mode voltage, the three-phase transmitter is configured to configure the respective driving impedance of the selected signal branch to be less than the respective branch impedance of the selected signal branch.

In another aspect, a method for reducing signal skew in a three-phase transmitter is provided. The method comprises identifying a signal branch among a first signal branch, a second signal branch, and a third signal branch of a three-phase transmitter, wherein the signal branch is selected to function as a common mode branch by being coupled to a common mode voltage. The method also comprises configuring a respective driving impedance of the selected signal branch to be less than a respective branch impedance of the selected signal branch.

In another aspect, a three-phase communication circuit is provided. The three-phase communication circuit comprises a three-phase transmitter. The three-phase transmitter comprises a first signal branch, a second signal branch, and a third signal branch. The three-phase communication circuit also comprises a pre-driver circuit. The pre-driver circuit is configured to generate a first pattern signal, a second pattern signal, and a third pattern signal corresponding to the first signal branch, the second signal branch, and the third signal branch, respectively, wherein each of the first pattern signal, the second pattern signal, and the third pattern signal indicates a respective present voltage and a respective future voltage of a corresponding signal branch among the first signal branch, the second signal branch, and the third signal branch. The three-phase communication circuit also comprises a pattern detector. The pattern detector is configured to determine a present common mode branch among the first signal branch, the second signal branch, and the third signal branch based on the first pattern signal, the second pattern signal, and the third pattern signal, wherein the respective present voltage of the present common mode branch is equal to a common mode voltage. The pattern detector is also configured to couple a current source to the present common mode branch if the respective future voltage of the present common mode branch is lower than the common mode voltage. The pattern detector is also configured to couple a current sink to the present common mode branch if the respective future voltage of the present common mode branch is higher than the common mode voltage.

In another aspect, a method for reducing signal skew in a three-phase communication circuit is provided. The method comprises receiving a first pattern signal, a second pattern signal, and a third pattern signal indicating a respective present voltage and a respective future voltage of a first signal branch, a second signal branch, and a third signal branch of a three-phase transmitter, respectively. The method also comprises identifying a present common mode branch among the first signal branch, the second signal branch, and the third signal branch based on the first pattern signal, the second pattern signal, and the third pattern signal, wherein the respective present voltage of the present common mode branch is equal to a common mode voltage. The method also comprises coupling a current source to the present common mode branch if the respective future voltage of the present common mode branch is lower than the common mode voltage. The method also comprises coupling a current sink to the present common mode branch if the respective future voltage of the present common mode branch is higher than the common mode voltage.

BRIEF DESCRIPTION OF THE FIGURES

FIG. 2A is an exemplary plot illustrating one aspect of a signal skew produced by the conventional three-phase transmitter of FIG. 1;

DETAILED DESCRIPTION

Figure 1:
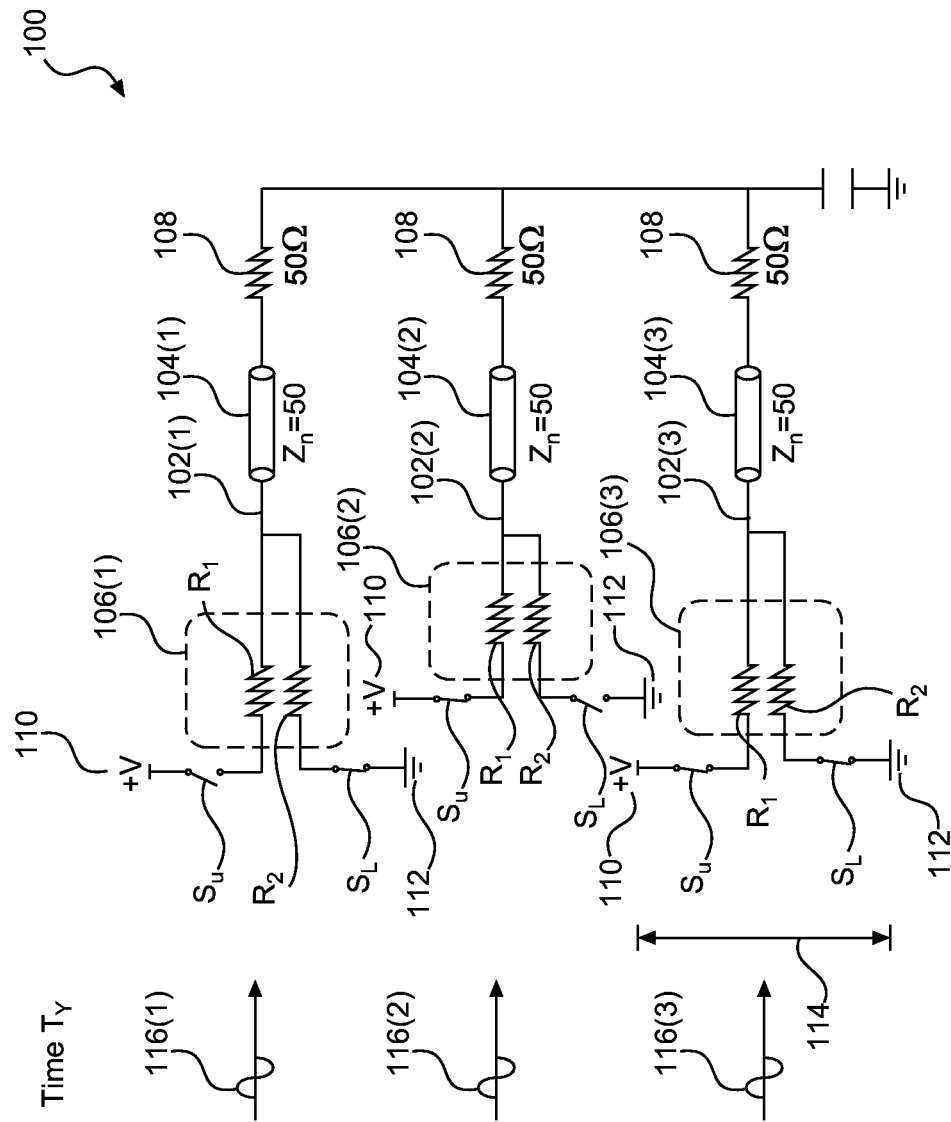
FIG. 1 is a schematic diagram of an exemplary conventional three-phase transmitter according to the MIPI® Alliance three-phase camera serial interface (CSI-3) specification.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include skew control for three-phase communication. In a non-limiting example, the skew control for three-phase communication may be supported in mobile communication devices using the MIPI® Alliance three-phase camera serial interface (CSI-3) specification. A three-phase communication involves three signal branches. A signal skew may occur when one signal branch is being coupled to a common mode voltage while another signal branch is being decoupled from the common mode voltage. In this regard, in one aspect, an impedance mismatch is introduced in the signal branch being coupled to the common mode voltage to help shift a rightmost crossing of the signal skew leftward. In another aspect, a current source or a current sink is coupled to the signal branch being decoupled from the common mode voltage to help shift a leftmost crossing of the signal skew rightward. More specifically, the current source or the current sink is coupled to the signal branch if the signal branch is switched from the common mode voltage to a lower voltage or a higher voltage. By shifting the rightmost crossing leftward and the leftmost crossing rightward, it is possible to reduce the signal skew, thus leading to reduced jitter and improved data integrity in the three-phase communication.

Figure 2B:
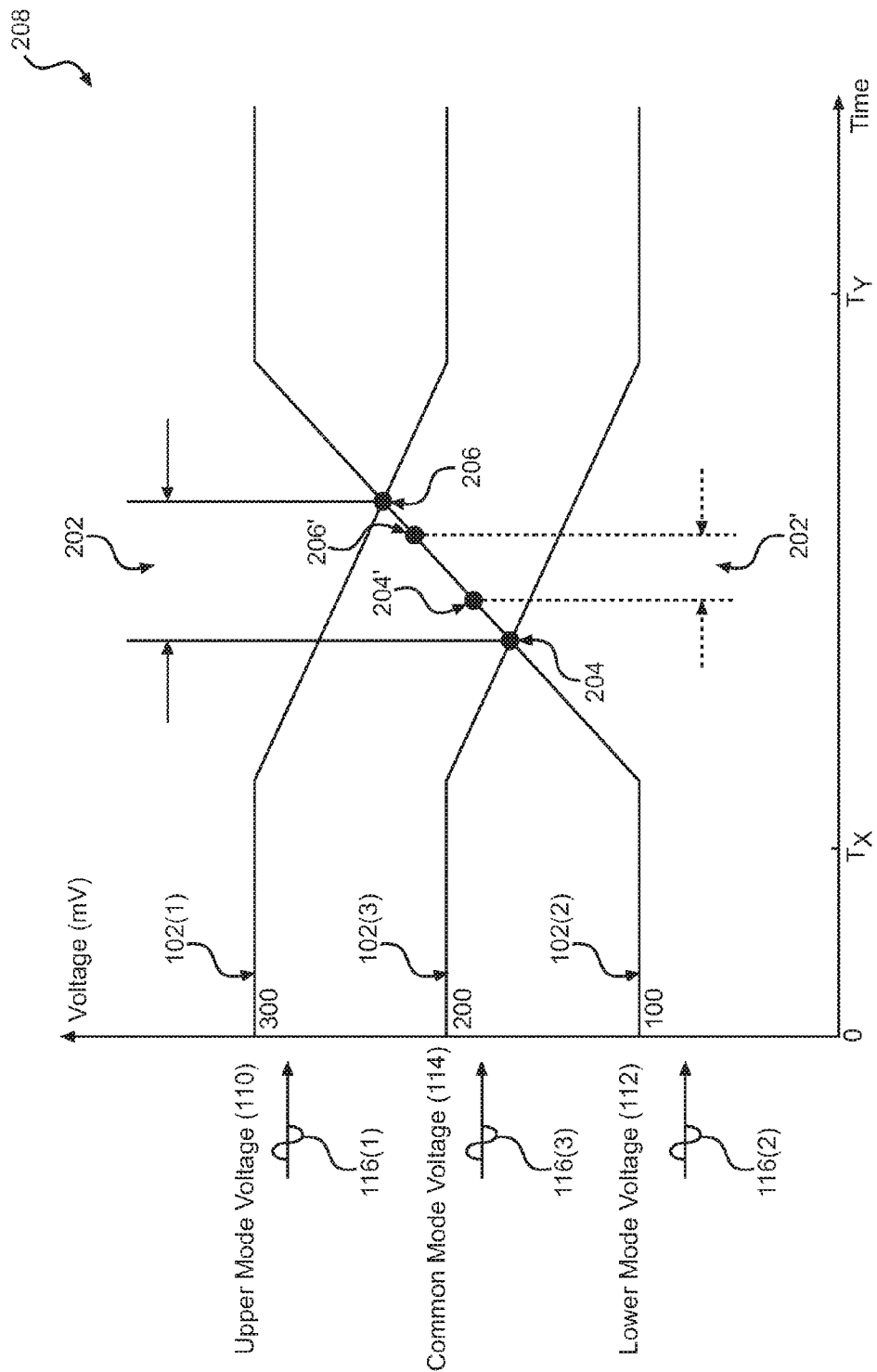
FIG. 2B is an exemplary plot illustrating another aspect of the signal skew produced by the conventional three-phase transmitter of FIG. 1.

Before discussing aspects of skew control for three-phase communication that include specific aspects of the present disclosure, a brief overview of a conventional three-phase transmitter, which may, in a non-limiting example, be used in a camera as part of the CSI-3 specification, and an illustration of signal skew associated with the conventional three-phase transmitter are provided in FIGS. 1, 2A, and 2B. The discussion of specific exemplary aspects of the skew control for three-phase communication starts below with reference to FIG. 3. To help describe time-based events that occur during the three-phase communication, a time $T_X$ and a time $T_Y$ are referenced hereinafter to represent a present time and a future time, respectively.

In this regard, FIG. 1 is a schematic diagram of an exemplary conventional three-phase transmitter 100 according to the MIPI® Alliance three-phase camera serial interface (CSI-3) specification. The conventional three-phase transmitter 100 comprises a first signal branch 102(1), a second signal branch 102(2), and a third signal branch 102(3). The first signal branch 102(1), the second signal branch 102(2), and the third signal branch 102(3) include respective branch impedances 104(1)-104(3) and respective driving impedances 106(1)-106(3). In a non-limiting example, each of the respective branch impedances 104(1)-104(3) equals fifty ohms (50Ω). The first signal branch 102(1), the second signal branch 102(2), and the third signal branch 102(3) are each terminated by a 50Ω resistor 108. Each of the respective driving impedances 106(1)-106(3) includes a first resistor ($R_1$) and a second resistor ($R_2$) disposed in a parallel arrangement. In a non-limiting example, the $R_1$ and $R_2$ have one hundred ohms (100Ω) resistances.

Each of the first signal branch 102(1), the second signal branch 102(2), and the third signal branch 102(3) can be coupled selectively to an upper mode voltage 110, a lower mode voltage 112, or a common mode voltage 114 by a switch $S_U$ and/or a switch $S_L$. In a non-limiting example, the upper mode voltage 110, the lower mode voltage 112, or the common mode voltage 114 are three hundred millivolts (300 mV), one hundred millivolts (100 mV), and two hundred millivolts (200 mV), respectively. The settings of the switch $S_U$ and the switch $S_L$ in the first signal branch 102(1), the second signal branch 102(2), and the third signal branch 102(3) are driven by a first branch signal 116(1), a second branch signal 116(2), and a third branch signal 116(3), respectively. In a non-limiting example, the first signal branch 102(1), the second signal branch 102(2), and the third signal branch 102(3) are coupled to the upper mode voltage 110, the common mode voltage 114, and the lower mode voltage 112, respectively, at the time $T_X$. When the first branch signal 116(1) causes the first signal branch 102(1) to transition from being coupled to the upper mode voltage 110 to being coupled to the lower mode voltage 112 at the time $T_Y$, the switch $S_L$ of the first signal branch 102(1) is closed and the switch $S_U$ of the first signal branch 102(1) is opened. In this regard, the respective driving impedance 106(1) is determined by the $R_2$. When the second branch signal 116(2) causes the second signal branch 102(2) to transition from being coupled to the common mode voltage 114 to being coupled to the upper mode voltage 110 at the time $T_Y$, the switch $S_U$ of the second signal branch 102(2) is closed and the switch $S_L$ of the second signal branch 102(2) is opened. In this regard, the second signal branch 102(2) is transitioning out of a common mode and the respective driving impedance 106(2) is determined by the $R_1$.

With continuing reference to FIG. 1, when the third branch signal 116(3) causes the third signal branch 102(3) to transition from being coupled to the lower mode voltage 112 to being coupled to the common mode voltage 114 at the time $T_Y$, the switch $S_L$ and the switch $S_U$ of the third signal branch 102(3) are both closed. In this regard, the third signal branch 102(3) is transitioning into the common mode and functions as a common mode branch. The respective driving impedance 106(3) is determined by the $R_1$ and the $R_2$ that are disposed in a parallel arrangement. Given that the resistances of the $R_1$ and the $R_2$ are both 100Ω, the respective driving impedance 106(3) is 50Ω and matches the respective branch impedance 104(3) of the third signal branch 102(3). When the second signal branch 102(2) transitions out of the common mode while the third signal branch 102(3) is transitioning into the common mode, a signal skew may occur. To illustrate the signal skew produced by the conventional three-phase transmitter 100, FIGS. 2A and 2B are provided.

In this regard, FIG. 2A is an exemplary plot 200 illustrating one aspect of a signal skew 202 produced by the conventional three-phase transmitter 100 of FIG. 1. Elements of FIG. 1 are referenced in connection with FIG. 2A and will not be re-described herein.

A signal skew refers to the difference between propagation delays of any two signals at identical transitions. As illustrated in FIG. 2A, at the time $T_X$, the first signal branch 102(1), the second signal branch 102(2) and the third signal branch 102(3) are respectively coupled to the upper mode voltage 110, the common mode voltage 114, and the lower mode voltage 112 by the first branch signal 116(1), the second branch signal 116(2), and the third branch signal 116(3). Subsequently at the time $T_Y$, the first branch signal 116(1), the second branch signal 116(2), and the third branch signal 116(3) respectively cause the first signal branch 102(1), the second signal branch 102(2), and the third signal branch 102(3) to be coupled to the lower mode voltage 112, the upper mode voltage 110, and the common mode voltage 114. In this regard, at the time $T_Y$, the third signal branch 102(3) transitions into the common mode and becomes the common mode branch while the second signal branch 102(2) is transitioning out of the common mode. The difference between propagation delays caused by the third signal branch 102(3), which transitions into the common mode at the time $T_Y$, and the second signal branch 102(2), which transitions out of the common mode at the time $T_Y$, results in the signal skew 202 in the conventional three-phase transmitter 100 of FIG. 1.

As illustrated in FIG. 2A, the signal skew 202 is defined by a leftmost crossing 204 and a rightmost crossing 206. The leftmost crossing 204 is determined by the second signal branch 102(2) that transitions out of (or leaves) the common mode and the rightmost crossing 206 is determined by the third signal branch 102(3) that transitions into (or enters) the common mode. The farther apart the leftmost crossing 204 and the rightmost crossing 206 are, the more severe the signal skew 202 becomes. If the signal skew 202 is examined using an eye diagram, the farther apart the leftmost crossing 204 and the rightmost crossing 206 are, the smaller the eye opening becomes in the eye diagram. The signal skew 202 can cause signal distortions and consequently data losses in the conventional three-phase transmitter 100 of FIG. 1. Hence, it is desirable to reduce the signal skew 202 by shifting the leftmost crossing 204 rightward to a new leftmost crossing 204' and shifting the rightmost crossing 204 leftward to a new rightmost crossing 206'. As the new leftmost crossing 204' and the new rightmost crossing 206' become closer to each other, a reduced signal skew 202' can be achieved in the conventional three-phase transmitter 100 of FIG. 1.

FIG. 2B is an exemplary plot 208 illustrating another aspect of the signal skew 202 produced by the conventional three-phase transmitter 100 of FIG. 1. As illustrated in FIG. 2B, at the time $T_X$, the first signal branch 102(1), the second signal branch 102(2), and the third signal branch 102(3) are respectively coupled to the upper mode voltage 110, the lower mode voltage 112, and the common mode voltage 114 by the first branch signal 116(1), the second branch signal 116(2), and the third branch signal 116(3). Subsequently at the time $T_Y$, the first branch signal 116(1), the second branch signal 116(2), and the third branch signal 116(3) respectively cause the first signal branch 102(1), the second signal branch 102(2), and the third signal branch 102(3) to be coupled to the common mode voltage 114, the upper mode voltage 110, and the lower mode voltage 112. In this regard, at the time $T_Y$, the first signal branch 102(1) is transitioning into the common mode and becoming the common mode branch while the third signal branch 102(3) is transitioning out of the common mode. The difference between propagation delays caused by the first signal branch 102(1), which transitions into the common mode at the time $T_Y$, and the third signal branch 102(3), which transitions out of the common mode at the time $T_Y$, results in the signal skew 202 in the conventional three-phase transmitter 100 of FIG. 1.

Figure 3:
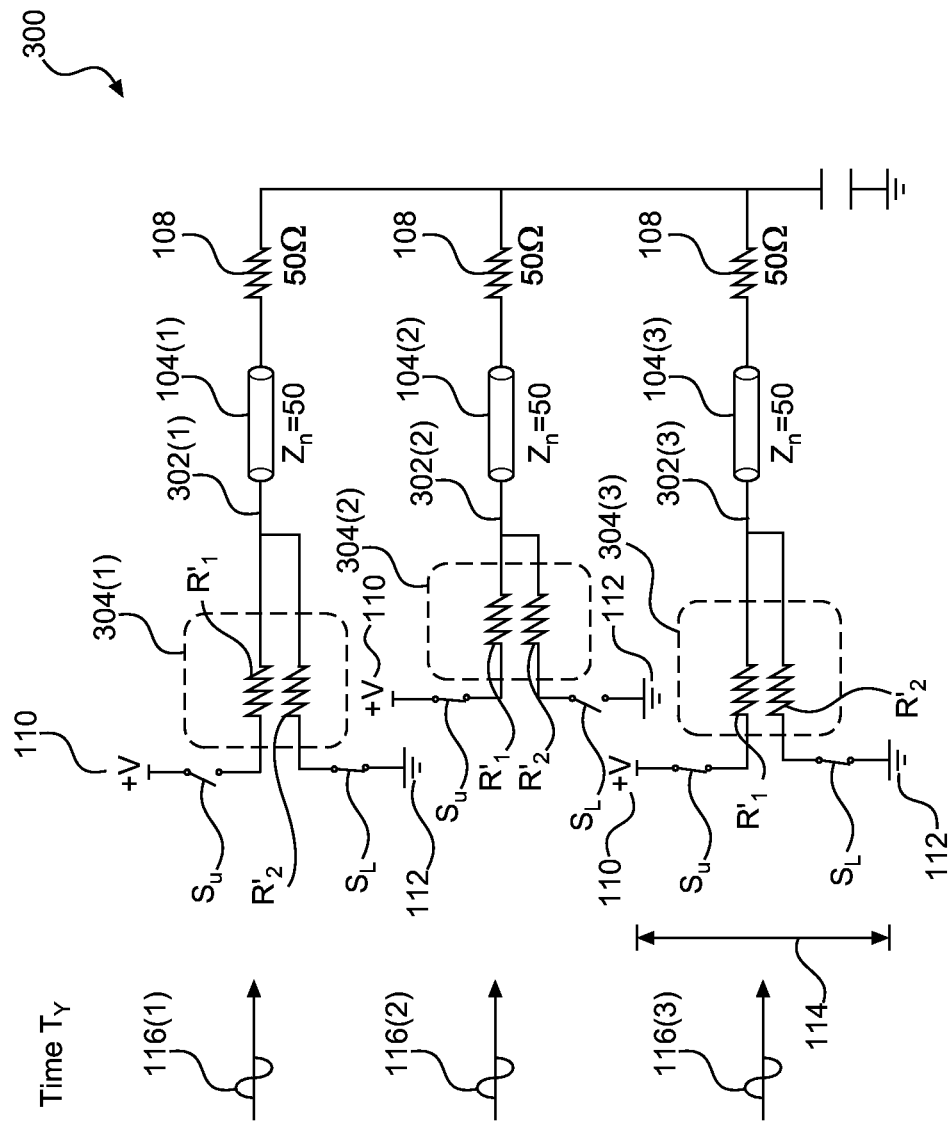
FIG. 3 is a schematic diagram of an exemplary three-phase transmitter configured to shift a rightmost crossing leftward to reduce the signal skew illustrated in FIGS. 2A and 2B.
Figure 4:
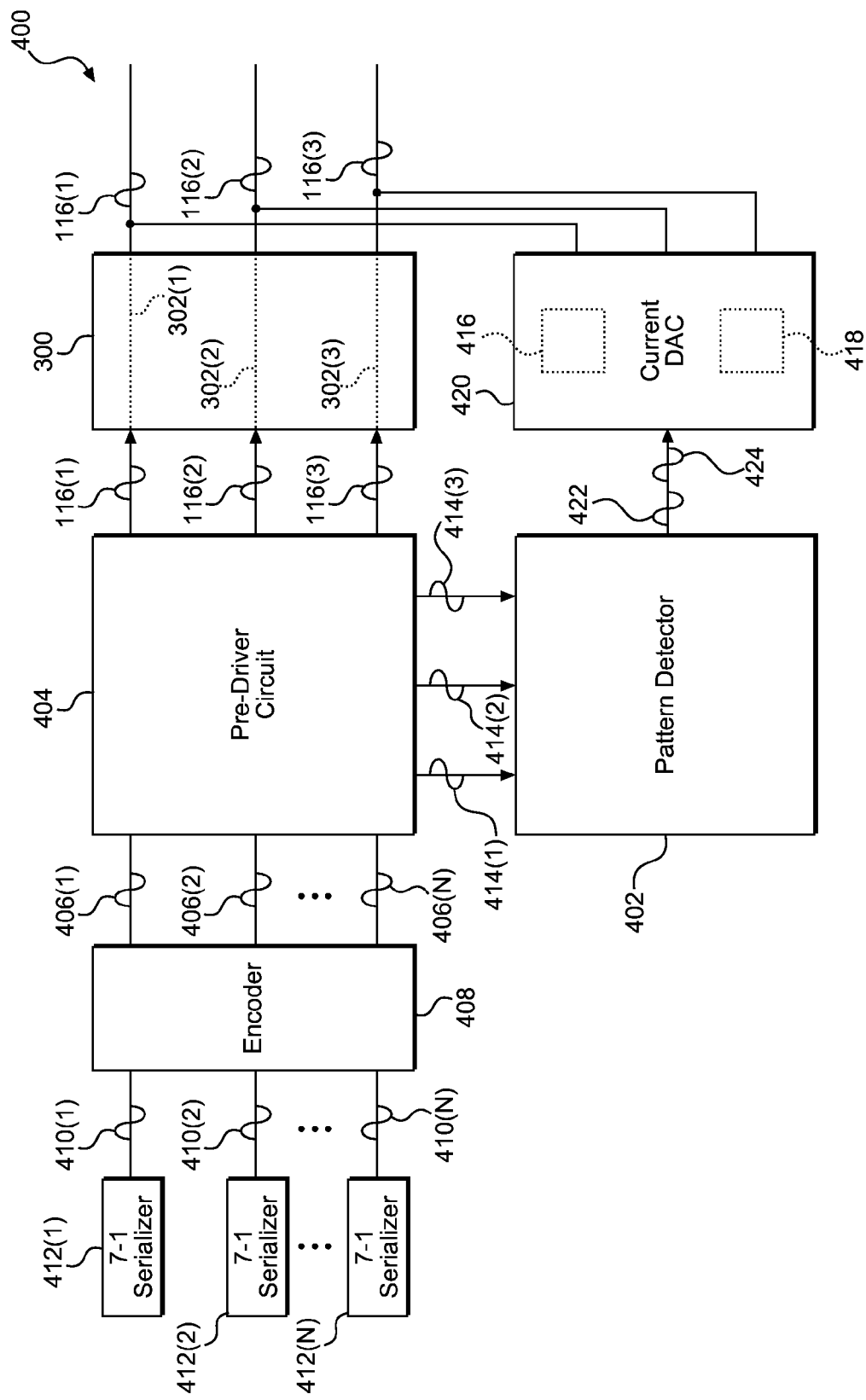
FIG. 4 is a schematic diagram of an exemplary three-phase communication circuit comprising a pattern detector configured to shift a leftmost crossing rightward to reduce the signal skew illustrated in FIGS. 2A and 2B.

As discussed in reference to FIGS. 2A and 2B, the signal skew 202 may be reduced to the reduced signal skew 202' by shifting the leftmost crossing 204 rightward to the new leftmost crossing 204' and shifting the rightmost crossing 206 leftward to the new rightmost crossing 206'. To help understand the mechanisms for shifting the leftmost crossing 204 to the new leftmost crossing 204' and shifting the rightmost crossing 206 to the new rightmost crossing 206', FIGS. 3 and 4 are provided. Common elements between FIGS. 1, 2A, 2B, 3, and 4 are shown therein with common element numbers and will not be re-described herein.

In this regard, FIG. 3 is a schematic diagram of an exemplary three-phase transmitter 300 configured to shift the rightmost crossing 206 leftward to reduce the signal skew 202. The three-phase transmitter 300 comprises a first signal branch 302(1), a second signal branch 302(2), and a third signal branch 302(3). The first signal branch 302(1), the second signal branch 302(2), and the third signal branch 302(3) include the respective branch impedances 104(1)-104(3) and respective driving impedances 304(1)-304(3). Each of the respective driving impedances 304(1)-304(3) includes a first resistor ($R'_1$) and a second resistor ($R'_2$) disposed in a parallel arrangement.

With reference to FIG. 3, at the time $T_Y$, the three-phase transmitter 300 receives the first branch signal 116(1), the second branch signal 116(2), and the third branch signal 116(3). The first branch signal 116(1) causes the first signal branch 302(1) to transition from being coupled to the upper mode voltage 110 to being coupled to the lower mode voltage 112. As such, the switch $S_U$ of the first signal branch 302(1) is open and the switch $S_L$ of the first signal branch 302(1) is closed. The respective driving impedance 304(1) equals the $R'_2$. The second branch signal 116(2) causes the second signal branch 302(2) to transition from being coupled to the common mode voltage 114 to being coupled to the upper mode voltage 110. As a result, the switch $S_L$ of the second signal branch 302(2) is open and the switch $S_U$ of the second signal branch 302(2) is closed. In this regard, the second signal branch 302(2) transitions out of the common mode and the respective driving impedance 304(2) equals the $R'_1$.

The third branch signal 116(3) causes the third signal branch 302(3) to transition from being coupled to the lower mode voltage 112 to being coupled to the common mode voltage 114. Accordingly, both the switch $S_U$ and the switch $S_L$ of the third signal branch 302(3) are closed. In this regard, the third branch signal 116(3) causes the third signal branch 302(3) to transition into the common mode and function as the common mode branch. Since the $R'_1$ and the $R'_2$ are disposed in parallel arrangement, the respective driving impedance 304(3) equals an average of the resistance of the $R'_1$ and the resistance of the $R'_2$ (($R'_1+R'_2$)/2). The resistances of the $R'_1$ and $R'_2$ are selected to ensure that the respective driving impedance 304(3) is less than the respective branch impedance 104(3). In a non-limiting example, the $R'_1$ and the $R'_2$ may be selected to provide the respective driving impedance 304(3) as one-half of the respective branch impedance 104(3). In another non-limiting example, the $R'_1$ and the $R'_2$ may each have 50Ω resistance, thus configuring the respective driving impedance 304(3) to 25Ω. By creating a mismatch between the respective driving impedance 304(3) and the respective branch impedance 104(3), it is possible to expedite resistor-capacitor (RC) setup in the three-phase transmitter 300. As is illustrated later in FIGS. 5A and 5B, the expedited RC setup can help shift the rightmost crossing 206 leftward to the new rightmost crossing 206', thus reducing the signal skew 202 in the three-phase transmitter 300.

FIG. 4 is a schematic diagram of an exemplary three-phase communication circuit 400 comprising a pattern detector 402 configured to shift the leftmost crossing 204 rightward to reduce the signal skew 202. The three-phase communication circuit 400 comprises the three-phase transmitter 300 of FIG. 3. The three-phase transmitter 300 is configure to receive the first branch signal 116(1), the second branch signal 116(2), and the third branch signal 116(3) from a pre-driver circuit 404. The pre-driver circuit 404 generates the first branch signal 116(1), the second branch signal 116(2), and the third branch signal 116(3) based on a plurality of input streams 406(1)-406(N) received from an encoder 408. The encoder 408 generates the plurality of input streams 406(1)-406(N) based on a plurality of serialized data streams 410(1)-410(N) received from a plurality of serializers 412(1)-412(N), respectively. In a non-limiting example, each of the plurality of serializers 412(1)-412(N) is a seven-to-one (7-1) serializer.

With continuing reference to FIG. 4, at the time $T_X$, the first signal branch 302(1), the second signal branch 302(2), and the third signal branch 302(3) are coupled to the upper mode voltage 110, the common mode voltage 114, and the lower mode voltage 112, respectively. In this regard, the second signal branch 302(2) is in the common mode and functions as the common mode branch (the present common mode branch) at the time $T_X$. At the time $T_Y$, the first branch signal 116(1), the second branch signal 116(2), and the third branch signal 116(3) respectively cause the first signal branch 302(1), the second signal branch 302(2), and the third signal branch 302(3) to be coupled to the lower mode voltage 112, the upper mode voltage 110, and the common mode voltage 114. In this regard, the third signal branch 302(3) is in the common mode and functions as the common mode branch (the future common mode branch) at the time $T_Y$. Thus, at the time $T_Y$, the present common mode branch, which is the second signal branch 302(2), is leaving the common mode and decoupled from the common mode voltage 114 while the future common mode branch, which is the third signal branch 302(3), is entering the common mode and coupled to the common mode voltage 114. As such, it is possible to predict that the third signal branch 302(3) is going to become the common mode branch at the time $T_Y$ by examining the third branch signal 116(3) at the time $T_X$.

In this regard, the pre-driver circuit 404 is configured to generate a first pattern signal 414(1), a second pattern signal 414(2), and a third pattern signal 414(3) that correspond with the first signal branch 302(1), the second signal branch 302(2), and the third signal branch 302(3), respectively. Each of the first pattern signal 414(1), the second pattern signal 414(2), and the third pattern signal 414(3) indicates a respective present voltage (not shown) and a respective future voltage (not shown) of a corresponding signal branch among the first signal branch 302(1), the second signal branch 302(2), and the third signal branch 302(3). For example, the first pattern signal 414(1) indicates the respective present voltage and the respective future voltage of the first signal branch 302(1) at the time $T_X$ and the time $T_Y$, respectively. The second pattern signal 414(2) indicates the respective present voltage and the respective future voltage of the second signal branch 302(2) at the time $T_X$ and the time $T_Y$, respectively. The third pattern signal 414(3) indicates the respective present voltage and the respective future voltage of the third signal branch 302(3) at the time $T_X$ and the time $T_Y$, respectively.

With continuing reference to FIG. 4, at the time $T_X$, the pattern detector 402 examines the first pattern signal 414(1), the second pattern signal 414(2), and the third pattern signal 414(3) to determine the present common mode branch among the first signal branch 302(1), the second signal branch 302(2), and the third signal branch 302(3). A signal branch among the first signal branch 302(1), the second signal branch 302(2), and the third signal branch 302(3) can be deemed as the present common mode branch if the respective present voltage of the signal branch equals the common mode voltage 114. For example, the second signal branch 302(2) is the present common mode branch if the respective present voltage indicated by the second pattern signal 414(2) equals the common mode voltage 114. Once the present common mode branch is determined, the pattern detector 402 is able to further determine the respective future voltage of the present common mode branch based on the respective future voltage indicated by the respective pattern signal. For example, if the second signal branch 302(2) is the present common mode branch, the pattern detector 402 is able to determine the future voltage of the second signal branch 302(2) based on the second pattern signal 414(2).

With continuing reference to FIG. 4, to shift the leftmost crossing 204 (not shown) to the new leftmost crossing 204' (not shown), the pattern detector 402 couples a current source 416 to the present common mode branch if the present common mode branch is transitioning to the respective future voltage that is lower than the common mode voltage 114. In contrast, the pattern detector 402 couples a current sink 418 to the present common mode branch if the present common mode branch is transitioning to the respective future voltage that is higher than the common mode voltage 114. In a non-limiting example (not shown), the current source 416 and the current sink 418 may be provided in a current digital-to-analog converter (DAC) circuit 420. In a second non-limiting example (not shown), the current source 416 and the current sink 418 may be integrated with the pattern detector 402.

With continuing reference to FIG. 4, the pre-driver circuit 404 is configured to maintain synchronization between the first branch signal 116(1), the second branch signal 116(2), the third branch signal 116(3), the source-current signal 422, and the sink-current signal 424. In this regard, the current source 416 or the current sink 418 can be coupled to the present common mode branch when the present common mode branch transitions out of the common mode at the time $T_Y$.

Figure 5A:
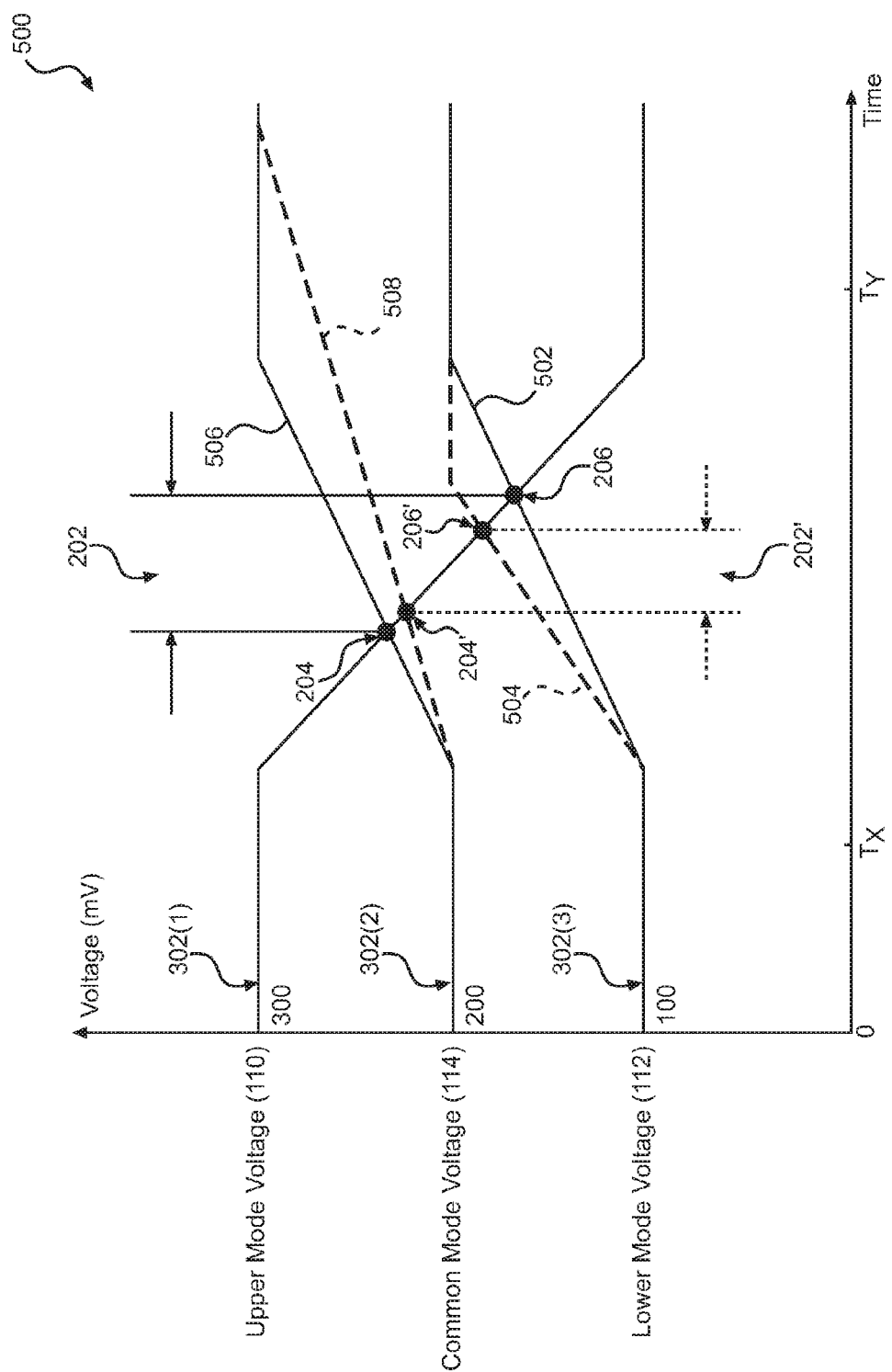
FIG. 5A is an exemplary plot illustrating one aspect of signal skew reduction provided by the three-phase transmitter of FIG. 3 and the three-phase communication circuit of FIG. 4.

FIG. 5A is an exemplary plot 500 illustrating one aspect of signal skew reduction provided by the three-phase transmitter 300 of FIG. 3 and the three-phase communication circuit 400 of FIG. 4. Elements of FIG. 2A are referenced in connection with FIG. 5A and will not be re-described herein.

As discussed in FIG. 3, when the third branch signal 116(3) causes the third signal branch 302(3) to transition into the common mode and function as the common mode branch at the time $T_Y$, the three-phase transmitter 300 is configured to expedite the RC setup in the three-phase transmitter 300. The expedited RC setup in the three-phase transmitter 300 helps move an original transition curve 502 to a new transition curve 504. In other words, the expedited RC setup makes the new transition curve 504 steeper than the original transition curve 502, thus shifting the rightmost crossing 206 leftward to the new rightmost crossing 206'.

As discussed in FIG. 4, the pattern detector 402 couples the current sink 418 to the present common mode branch if the present common mode branch is transitioning to the respective future voltage that is higher than the common mode voltage 114. As illustrated in FIG. 5A, when the second signal branch 302(2), which is the present common mode branch, is transitioning from being coupled to the common mode voltage 114 to being coupled to the upper mode voltage 110 (the respective future voltage), a previous transition curve 506 is moved to a present transition curve 508 by coupling the current sink 418 to the second signal branch 302(2). As a result, the leftmost crossing 204 is shifted rightward to the new leftmost crossing 204' as the present transition curve 508 becomes shallower than the previous transition curve 506.

Figure 5B:
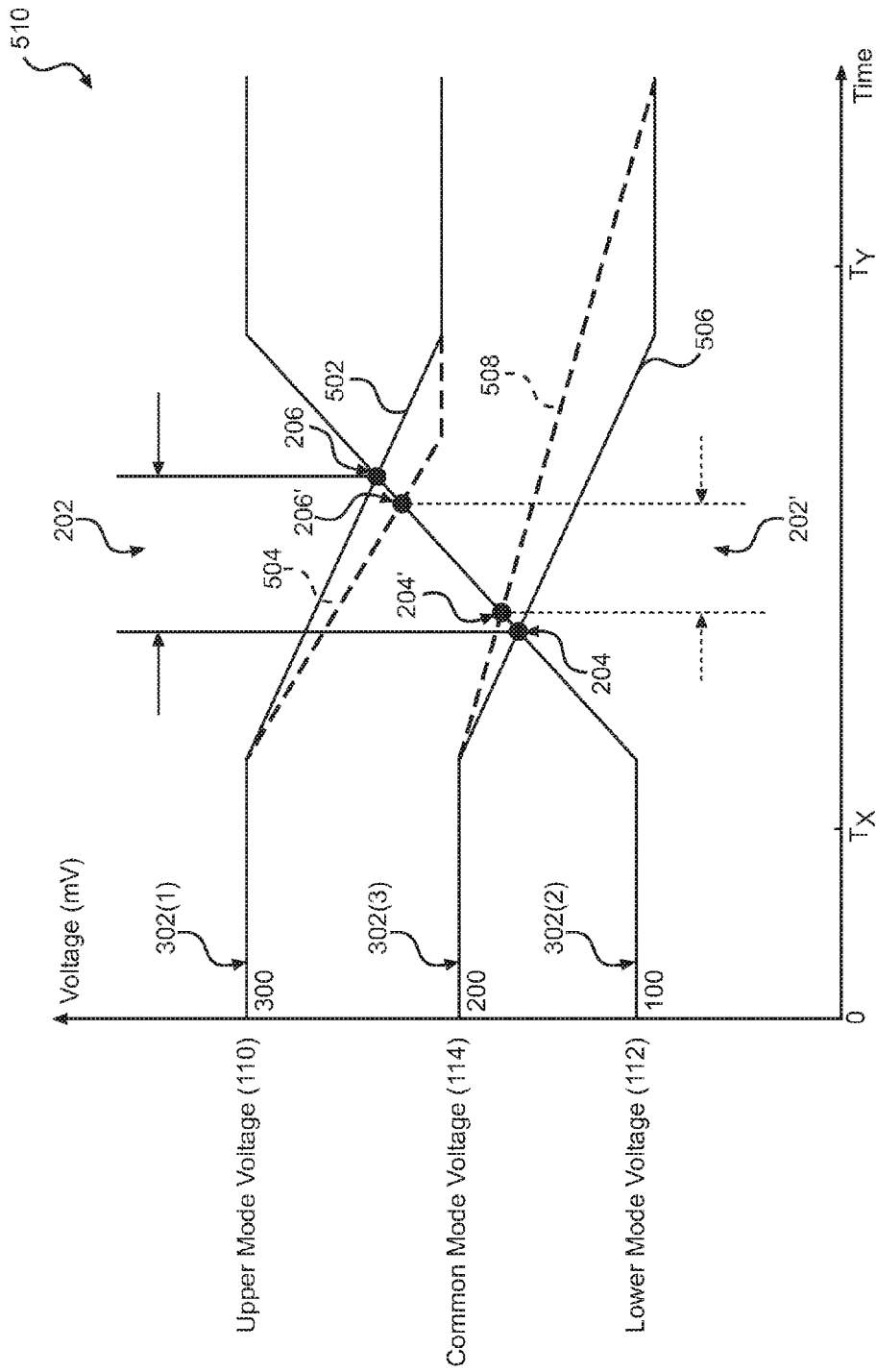
FIG. 5B is an exemplary plot illustrating another aspect of the signal skew reduction provided by the three-phase transmitter of FIG. 3 and the three-phase communication circuit of FIG. 4.

Similar to FIG. 5A, FIG. 5B is an exemplary plot 510 illustrating another aspect of the signal skew reduction provided by the three-phase transmitter 300 of FIG. 3 and the three-phase communication circuit 400 of FIG. 4.

As discussed in FIG. 4, the pattern detector 402 couples the current source 416 to the present common mode branch if the present common mode branch is transitioning to the respective future voltage that is lower than the common mode voltage 114. As illustrated in FIG. 5B, when the third signal branch 302(3), which is the present common mode branch, is transitioning from being coupled to the common mode voltage 114 to being coupled to the lower mode voltage 112 (the respective future voltage), the previous transition curve 506 is moved to the present transition curve 508 by coupling the current source 416 to the third signal branch 302(3). As a result, the leftmost crossing 204 is shifted rightward to the new leftmost crossing 204' as the present transition curve 508 becomes shallower than the previous transition curve 506.

Likewise, when the first branch signal 116(1) causes the first signal branch 302(1) to transition into the common mode and function as the common mode branch at the time $T_Y$, the three-phase transmitter 300 is configured to expedite the RC setup in the three-phase transmitter 300. The expedited RC setup helps move the original transition curve 502 to the new transition curve 504. In other words, the expedited RC setup makes the new transition curve 504 steeper than the original transition curve 502, thus shifting the rightmost crossing 206 leftward to the new rightmost crossing 206'.

Figure 6:
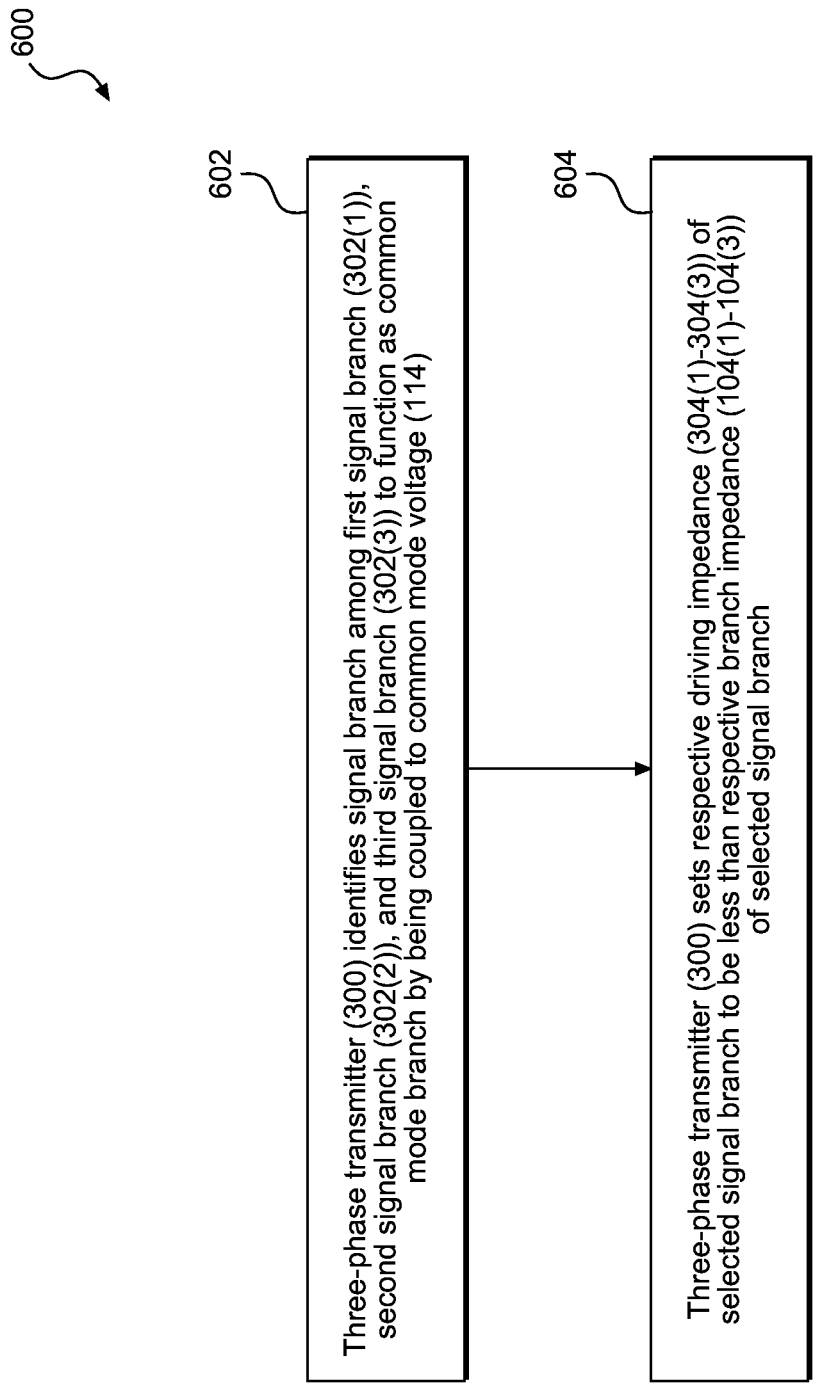
FIG. 6 is a flowchart illustrating an exemplary skew control process employed by the three-phase transmitter of FIG. 3 to shift the rightmost crossing leftward.

FIG. 6 is a flowchart illustrating an exemplary skew control process 600 employed by the three-phase transmitter 300 of FIG. 3 to shift the rightmost crossing 206 leftward. According to the skew control process 600, the three-phase transmitter 300 identifies a signal branch among the first signal branch 302(1), the second signal branch 302(2), and the third signal branch 302(3), wherein the signal branch is selected to function as the common mode branch by being coupled to the common mode voltage 114 (block 602). Once the common mode branch is identified, the three-phase transmitter 300 configures the respective driving impedance 304(1)-304(3) of the selected signal branch to be less than the respective branch impedance 104(1)-104(3) of the selected signal branch (block 604).

Figure 7:
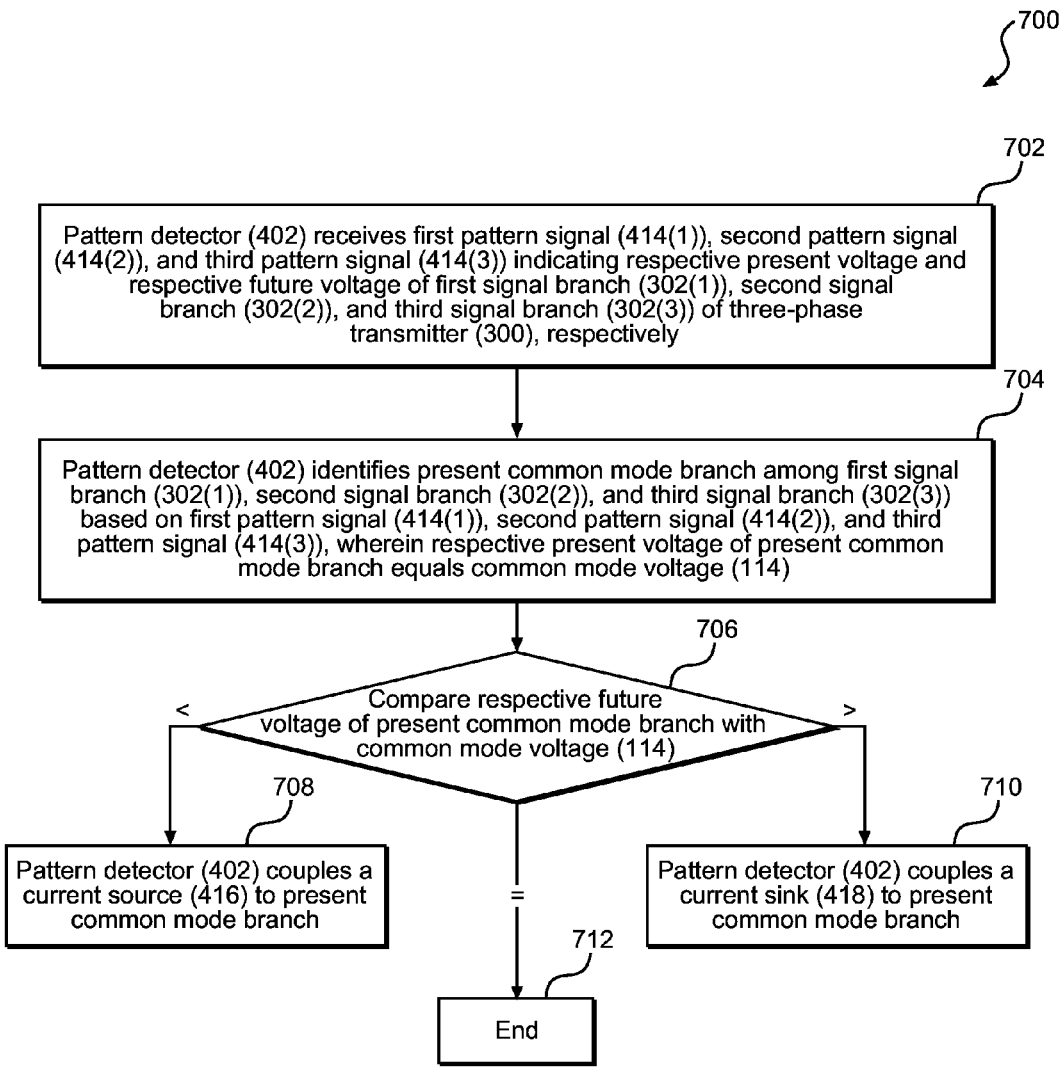
FIG. 7 is a flowchart illustrating another exemplary skew control process employed by the three-phase communication circuit of FIG. 4 to shift the leftmost crossing rightward.

FIG. 7 is a flowchart illustrating another exemplary skew control process 700 employed by the three-phase communication circuit 400 of FIG. 4 to shift the leftmost crossing 204 rightward. According to the skew control process 700, the pattern detector 402 receives the first pattern signal 414(1), the second pattern signal 414(2), and the third pattern signal 414(3) indicating the respective present voltage and the respective future voltage of the first signal branch 302(1), the second signal branch 302(2), and the third signal branch 302(3), respectively (block 702). The pattern detector 402 then identifies the present common mode branch among the first signal branch 302(1), the second signal branch 302(2), and the third signal branch 302(3) based on the first pattern signal 414(1), the second pattern signal 414(2), and the third pattern signal 414(3), wherein the respective present voltage of the present common mode branch equals the common mode voltage 114 (block 704). The pattern detector 402 compares the respective future voltage of the present common mode branch with the common mode voltage 114 (block 706). If the respective future voltage of the present common mode branch is lower than the common mode voltage 114, the pattern detector 402 is configured to couple the current source 416 to the present common mode branch (block 708). In contrast, if the respective future voltage of the present common mode branch is higher than the common mode voltage 114, the pattern detector 402 is configured to couple the current sink 418 to the present common mode branch (block 710). The skew control process 700 ends if the respective future voltage of the present common mode branch equals the common mode voltage 114 (block 712).

The skew control for three-phase communication according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 8:
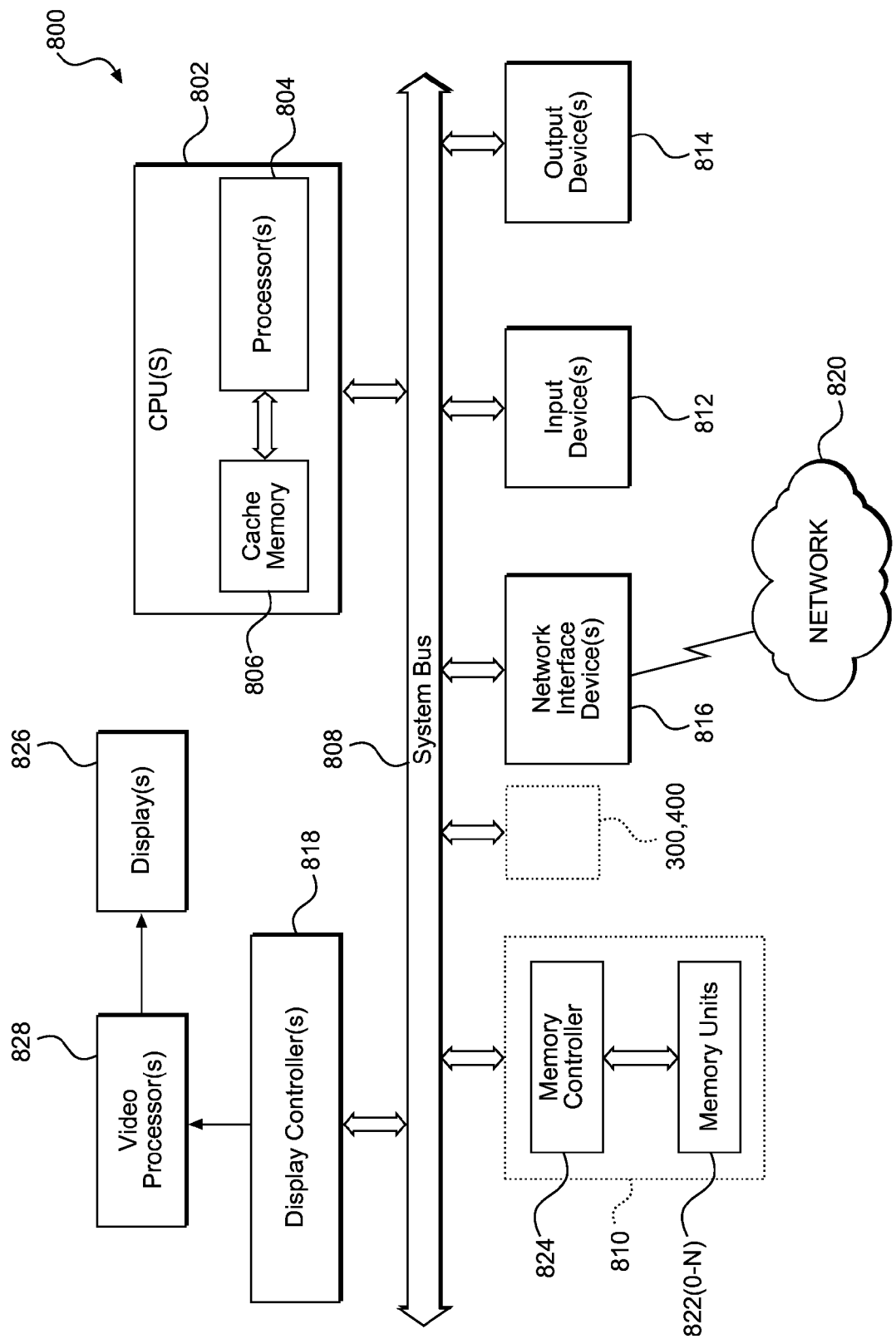
FIG. 8 illustrates an example of a processor-based system that can employ the three-phase transmitter of FIG. 3 and the three-phase communication circuit of FIG. 4.

In this regard, FIG. 8 illustrates an example of a processor-based system 800 that can employ the three-phase transmitter 300 of FIG. 3 and the three-phase communication circuit 400 of FIG. 4. In this example, the processor-based system 800 includes one or more central processing units (CPUs) 802, each including one or more processors 804. The CPU(s) 802 may have cache memory 806 coupled to the processor(s) 804 for rapid access to temporarily stored data. The CPU(s) 802 is coupled to a system bus 808. As is well known, the CPU(s) 802 communicates with these other devices by exchanging address, control, and data information over the system bus 808. Although not illustrated in FIG. 8, multiple system buses 808 could be provided, wherein each system bus 808 constitutes a different fabric.

Other master and slave devices can be connected to the system bus 808. As illustrated in FIG. 8, these devices can include a memory system 810, one or more input devices 812, one or more output devices 814, one or more network interface devices 816, and one or more display controllers 818, as examples. The three-phase transmitter 300 of FIG. 3 and the three-phase communication circuit 400 of FIG. 4 can also be connected to the system bus 808. The input device(s) 812 can include any type of input device, including, but not limited to, input keys, switches, voice processors, etc. The output device(s) 814 can include any type of output device, including, but not limited to, audio, video, other visual indicators, etc. The network interface device(s) 816 can be any device configured to allow exchange of data to and from a network 820. The network 820 can be any type of network, including, but not limited to, a wired or wireless network, a private or public network, a local area network (LAN), a wireless local area network (WLAN), a wide area network (WAN), a BLUETOOTH™ network, or the Internet. The network interface device(s) 816 can be configured to support any type of communications protocol desired. The memory system 810 can include one or more memory units 822(0-N) and a memory controller 824.

The CPU(s) 802 may also be configured to access the display controller(s) 818 over the system bus 808 to control information sent to one or more displays 826. The display controller(s) 818 sends information to the display(s) 826 to be displayed via one or more video processors 828, which process the information to be displayed into a format suitable for the display(s) 826. The display(s) 826 can include any type of display, including, but not limited to, a cathode ray tube (CRT), a liquid crystal display (LCD), a plasma display, a light emitting diode (LED) display, etc.

Figure 9:
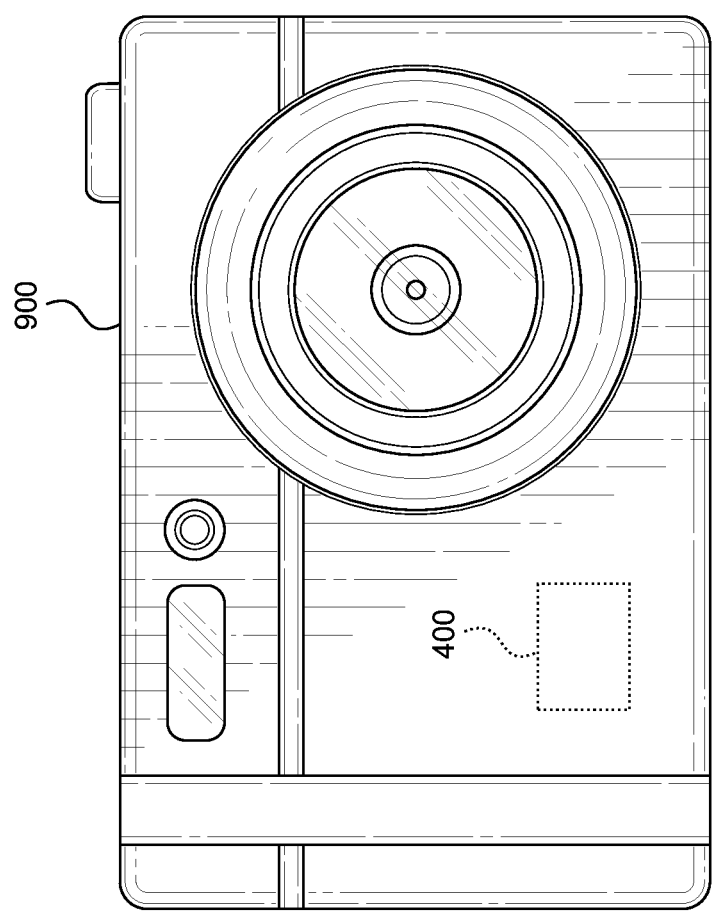
FIG. 9 illustrates an example of a digital camera that can employ the three-phase communication circuit of FIG. 4.

The three-phase communication circuit 400 of FIG. 4 may also be provided in a digital camera 900 as illustrated by the exemplary schematic diagram of FIG. 9.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A three-phase transmitter, comprising:
   a first signal branch, a second signal branch, and a third signal branch configured to provide a first output, a second output, and a third output, respectively, wherein each of the first signal branch, the second signal branch, and the third signal branch comprises a respective branch impedance and is further configured to provide a respective output among the first output, the second output, and the third output by being coupled to a respective voltage selected between an upper mode voltage, a common mode voltage lower than the upper mode voltage, and a lower mode voltage lower than the common mode voltage; and
   when a signal branch among the first signal branch, the second signal branch, and the third signal branch is selected to function as a common mode branch by being coupled to the common mode voltage, the three-phase transmitter is configured to configure a respective driving impedance of the selected signal branch to be less than the respective branch impedance of the selected signal branch.

2. The three-phase transmitter of claim 1, wherein the common mode voltage is two hundred millivolts (200 mV).

3. The three-phase transmitter of claim 1, wherein the respective driving impedance of the selected signal branch is one-half of the respective branch impedance of the selected signal branch.

4. The three-phase transmitter of claim 1, wherein the respective driving impedance of the selected signal branch is twenty-five ohms (25Ω).

5. The three-phase transmitter of claim 4, wherein the respective driving impedance of the selected signal branch is provided by two fifty ohms (50Ω) resistors disposed according to a parallel arrangement.

6. The three-phase transmitter of claim 4, wherein the respective branch impedance of the selected signal branch is fifty ohms (50Ω).

7. The three-phase transmitter of claim 1 integrated into a three-phase camera serial interface (CSI-3).

8. The three-phase transmitter of claim 1 integrated into an integrated circuit (IC).

9. The three-phase transmitter of claim 1 integrated into a device selected from the group consisting of: a set top box; an entertainment unit; a navigation device; a communications device; a fixed location data unit; a mobile location data unit; a mobile phone; a cellular phone; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; and a portable digital video player.

10. A method for reducing signal skew in a three-phase transmitter, comprising:
identifying a signal branch among a first signal branch, a second signal branch, and a third signal branch configured to provide a first output, a second output, and a third output, respectively, wherein the signal branch is selected to function as a common mode branch by being coupled to a common mode voltage that is lower than an upper mode voltage and higher than a lower mode voltage; and
configuring a respective driving impedance of the selected signal branch to be less than a respective branch impedance of the selected signal branch.

11. The method of claim 10, further comprising configuring the respective driving impedance of the selected signal branch to be one-half of the respective branch impedance of the selected signal branch.

12. The method of claim 10, further comprising configuring the respective driving impedance of the selected signal branch to be twenty-five ohms (25Ω).

13. A three-phase communication circuit, comprising:
a three-phase transmitter comprising a first signal branch, a second signal branch, and a third signal branch;
a pre-driver circuit configured to generate a first pattern signal, a second pattern signal, and a third pattern signal corresponding to the first signal branch, the second signal branch, and the third signal branch, respectively, wherein each of the first pattern signal, the second pattern signal, and the third pattern signal indicates a respective present voltage and a respective future voltage of a corresponding signal branch among the first signal branch, the second signal branch, and the third signal branch; and
a pattern detector configured to:
determine a present common mode branch among the first signal branch, the second signal branch, and the third signal branch based on the first pattern signal, the second pattern signal, and the third pattern signal, wherein the respective present voltage of the present common mode branch is equal to a common mode voltage;
couple a current source to the present common mode branch if the respective future voltage of the present common mode branch is a lower mode voltage lower than the common mode voltage; and
couple a current sink to the present common mode branch if the respective future voltage of the present common mode branch is an upper mode voltage higher than the common mode voltage.

14. The three-phase communication circuit of claim 13, wherein the pre-driver circuit is further configured to provide a first branch signal, a second branch signal, and a third branch signal to the first signal branch, the second signal branch, and the third signal branch of the three-phase transmitter, respectively, wherein the first branch signal, the second branch signal, and the third branch signal are configured to couple the first signal branch, the second signal branch, and the third signal branch to the respective future voltage, respectively.

15. The three-phase communication circuit of claim 14, wherein:
each of the first signal branch, the second signal branch, and the third signal branch of the three-phase transmitter comprises a respective branch impedance; and
the three-phase transmitter is configured to:
determine a future common mode branch among the first signal branch, the second signal branch, and the third signal branch based on the first branch signal, the second branch signal, and the third branch signal; and
configure a respective driving impedance of the future common mode branch to be less than the respective branch impedance of the future common mode branch.

16. The three-phase communication circuit of claim 15, wherein the respective driving impedance of the future common mode branch is one-half of the respective branch impedance of the future common mode branch.

17. The three-phase communication circuit of claim 15, wherein the respective driving impedance of the future common mode branch is twenty-five ohms (25Ω).

18. The three-phase communication circuit of claim 13 further comprising a current digital-to-analog converter (DAC) circuit, wherein the current DAC circuit comprises the current source and the current sink.

19. The three-phase communication circuit of claim 18, wherein the pattern detector is further configured to:
provide a source-current signal to the current DAC circuit to couple the current source to the present common mode branch; and
provide a sink-current signal to the current DAC circuit to couple the current sink to the present common mode branch.

20. The three-phase communication circuit of claim 13, further comprising:
a plurality of serializers configured to generate a plurality of serialized data streams; and an encoder configured to encode the plurality of serialized data streams to provide a plurality of input streams to the pre-driver circuit.

21. The three-phase communication circuit of claim 13 integrated into a three-phase camera serial interface (CSI-3).

22. The three-phase communication circuit of claim 13, wherein the pre-driver circuit is further configured to generate the first pattern signal indicating that the respective present voltage and the respective future voltage of the first signal branch are the upper mode voltage and the lower mode voltage, respectively.

23. The three-phase communication circuit of claim 13, wherein the pre-driver circuit is further configured to generate the second pattern signal indicating that the respective present voltage and the respective future voltage of the second signal branch are the common mode voltage and the upper mode voltage, respectively.

24. The three-phase communication circuit of claim 13, wherein the pre-driver circuit is further configured to generate the third pattern signal indicating that the respective present voltage and the respective future voltage of the third signal branch are the lower mode voltage and the common mode voltage, respectively.

25. The three-phase communication circuit of claim 13, wherein the pre-driver circuit is further configured to generate the first pattern signal indicating that the respective present voltage and the respective future voltage of the first signal branch are the upper mode voltage and the common mode voltage, respectively.

26. The three-phase communication circuit of claim 13, wherein the pre-driver circuit is further configured to generate the second pattern signal indicating that the respective present voltage and the respective future voltage of the second signal branch are the common mode voltage and the lower mode voltage, respectively.

27. The three-phase communication circuit of claim 13, wherein the pre-driver circuit is further configured to generate the third pattern signal indicating that the respective present voltage and the respective future voltage of the third signal branch are the lower mode voltage and the upper mode voltage, respectively.

28. A method for reducing signal skew in a three-phase communication circuit, comprising:
   receiving a first pattern signal, a second pattern signal, and a third pattern signal indicating a respective present voltage and a respective future voltage of a first signal branch, a second signal branch, and a third signal branch of a three-phase transmitter, respectively;
   identifying a present common mode branch among the first signal branch, the second signal branch, and the third signal branch based on the first pattern signal, the second pattern signal, and the third pattern signal, wherein the respective present voltage of the present common mode branch is equal to a common mode voltage;
   coupling a current source to the present common mode branch if the respective future voltage of the present common mode branch is lower than the common mode voltage; and
   coupling a current sink to the present common mode branch if the respective future voltage of the present common mode branch is higher than the common mode voltage.

29. The method of claim 28, further comprising:
   identifying a future common mode branch among the first signal branch, the second signal branch, and the third signal branch of the three-phase transmitter based on the first pattern signal, the second pattern signal, and the third pattern signal, wherein the respective future voltage of the future common mode branch is equal to the common mode voltage; and
   configuring a respective driving impedance of the future common mode branch to be less than a respective branch impedance of the future common mode branch.

30. The method of claim 29, further comprising configuring the respective driving impedance of the future common mode branch to be one-half of the respective branch impedance of the future common mode branch.

31. The method of claim 29, further comprising configuring the respective driving impedance of the future common mode branch to be twenty-five ohms (25Ω).

* * * * *